(12) United States Patent
Yang

(10) Patent No.: US 6,874,303 B1
(45) Date of Patent: Apr. 5, 2005

(54) GRASS TRIMMER DRIVABLE BY POWER TOOL

(76) Inventor: Chung Jeng Yang, P.O. Box 63-298, Taichung (TW), 406

( * ) Notice: Subject to any disclaimer, the term of this patent is extended or adjusted under 35 U.S.C. 154(b) by 0 days.

(21) Appl. No.: 10/888,709

(22) Filed: Jul. 12, 2004

(51) Int. Cl.[7] .................. A01D 34/13; A01D 34/00; B26B 19/30
(52) U.S. Cl. .................. 56/2; 56/296; 30/216
(58) Field of Search .................. 56/1, 2, 11.9, 255, 56/256, 296, 295; 30/216, 220, 223, 276

(56) References Cited

U.S. PATENT DOCUMENTS

| | | | |
|---|---|---|---|
| 2,867,040 A | * | 1/1959 | Mertesdorf .................. 30/240 |
| 3,851,388 A | * | 12/1974 | Weber et al. .................. 30/223 |
| 3,851,390 A | * | 12/1974 | Neal .......................... 30/276 |
| 3,959,878 A | * | 6/1976 | Irelan et al. .................. 30/220 |
| 3,973,378 A | | 8/1976 | Bartasevich et al. ......... 56/11.9 |
| 4,493,223 A | | 1/1985 | Kishi et al. .................... 74/371 |
| 4,619,045 A | * | 10/1986 | Mayer .......................... 30/216 |
| D317,853 S | * | 7/1991 | Clivio ............................ D8/8 |
| 5,197,268 A | | 3/1993 | Barrera ........................ 56/255 |

* cited by examiner

Primary Examiner—Robert E Pezzuto

(57) ABSTRACT

A grass trimmer includes a fixed cutter device secured to a housing and having one or more stationary cutter blades extended out of the housing, a movable cutter device rotatably secured to the fixed cutter device and having one or more cutter blades movable relative to the stationary cutter blade of the fixed cutter device to conduct cutting operations by an eccentric member of a rotary member. A drive shank is secured to the rotary member, and a power tool may engage with the shank, to drive the rotary member and the eccentric member relative to the movable cutter device, and to move the movable cutter device relative to the fixed cutter device in reciprocating action.

12 Claims, 6 Drawing Sheets

GRASS TRIMMER DRIVABLE BY POWER TOOL

BACKGROUND OF THE INVENTION

1. Field of the Invention

The present invention relates to a grass trimmer, and more particularly to a grass trimmer operatable or drivable by typical or separate power tools.

2. Description of the Prior Art

Various kinds of typical grass trimmers have been developed and comprise a motor solidly attached to or secured to a housing, for rotating or driving cutter blades.

For example, U.S. Pat. No. 3,973,378 to Bartasevich et al. and U.S. Pat. No. 5,197,268 to Barrera disclose two of the typical grass trimmers each also comprising a motor solidly attached to or secured to a housing, for rotating or driving cutter blades, such that the typical grass trimmers may comprise a large volume and may be expensive for the users.

U.S. Pat. No. 4,493,223 to Kishi et al. discloses one of the typical power tools for such as drilling purposes, and for rotating or driving screws, bolts, or the like. Normally, every family may have one or more typical power tools that have not been frequently used or operated. In addition, the typical power tools may not be used to rotate or drive the typical grass trimmers.

The present invention has arisen to mitigate and/or obviate the afore-described disadvantages of the conventional grass trimmers.

SUMMARY OF THE INVENTION

The primary objective of the present invention is to provide a grass trimmer operatable or drivable by typical or separate power tools.

In accordance with one aspect of the invention, there is provided a grass trimmer comprising a housing, a fixed cutter device secured to the housing, and including at least one stationary cutter blade extended out of the housing, a movable cutter device rotatably secured to the fixed cutter device with a pivot shaft and rotatable relative to the fixed cutter device in reciprocating action, the movable cutter device including at least one cutter blade extended out of the housing, and movable relative to the stationary cutter blade of the fixed cutter device for conducting cutting operations, a rotary member rotatably attached to the housing and including an eccentric member extended therefrom and engageable with the movable cutter device, to cause the movable cutter device to move relative to the fixed cutter device in reciprocating action when the rotary member is rotated relative to the housing, a drive shank secured to the rotary member and rotated in concert with the rotary member and including a free end extended out of the housing, and a power tool including an engaging end attachable to the free end of the shank, to rotate and drive the rotary member relative to the housing, and to move the eccentric member relative to the movable cutter device, and to move the movable cutter device relative to the fixed cutter device in reciprocating action.

The movable cutter device includes an oblong hole formed therein, the eccentric member of the rotary member is rotatably received in the oblong hole of the movable cutter device. The movable cutter device includes a gasket attached thereto and engaged around the oblong hole thereof, for engaging with the eccentric member of the rotary member.

The housing includes a passage formed therein, the rotary member includes a hub extended therefrom and rotatably engaged into the passage of the housing, to rotatably secure the rotary member to the housing. The housing includes a barrel engaged into the passage thereof, to rotatably receive the shank.

The free end of the shank includes a non-circular cross section, for example, the free end of the shank includes a hexagonal cross section, for allowing the shank to be rotated or driven by the power tool.

The housing includes at least one wheel rotatably attached thereto with a wheel axle. For example, the housing includes an orifice formed therein to rotatably receive the wheel axle, the wheel is attached to the wheel axle.

The housing includes a handle attached thereto for being held by users together with a hand grip of the power tool. The handle includes an arm rotatably secured to the housing, and a stem extended from the arm, and movable toward the hand grip of the power tool. The housing includes a fastener threaded thereto, and engageable with the handle, to secure the handle to the housing at selected angular position.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
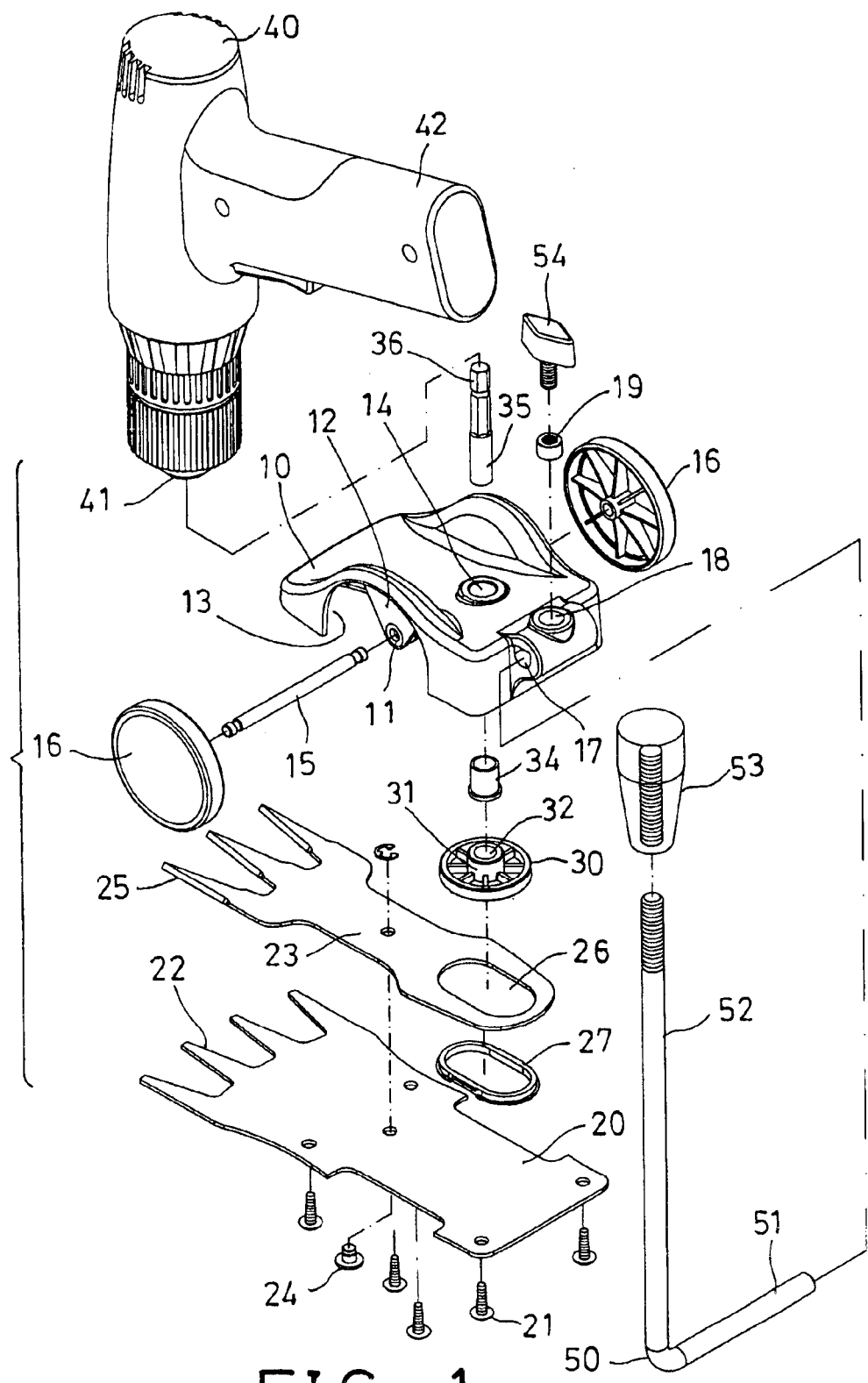
FIG. 1 is an exploded view of a grass trimmer and a power tool combination in accordance with the present invention.
Figure 2:
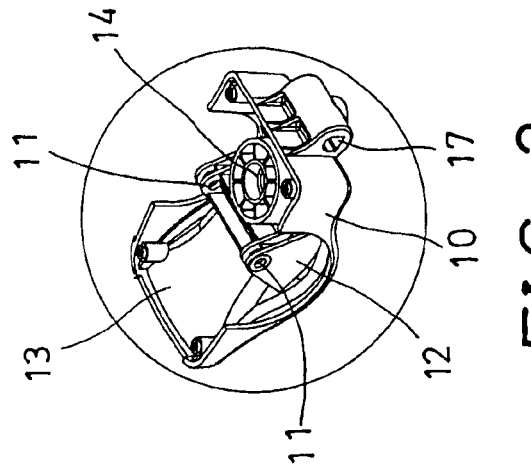
FIG. 2 is a bottom perspective view of a housing of the grass trimmer.
Figure 3:
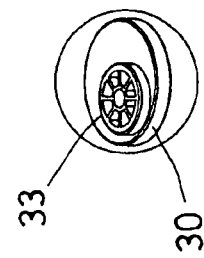
FIG. 3 is a bottom perspective view of an eccentric member of the grass trimmer.

Referring to the drawings, and initially to FIGS. 1–5, a grass trimmer in accordance with the present invention comprises a housing 10 including an orifice 11 formed therein, such as including a stay 12 extended into a chamber 13 thereof and having the orifice 11 formed in the stay 12, for rotatably receiving a wheel axle 15, therein. One or more, such as two wheels 16 are attached to the wheel axle 15 and rotatable relative to the housing 10 with the wheel axle 15.

Figure 5:
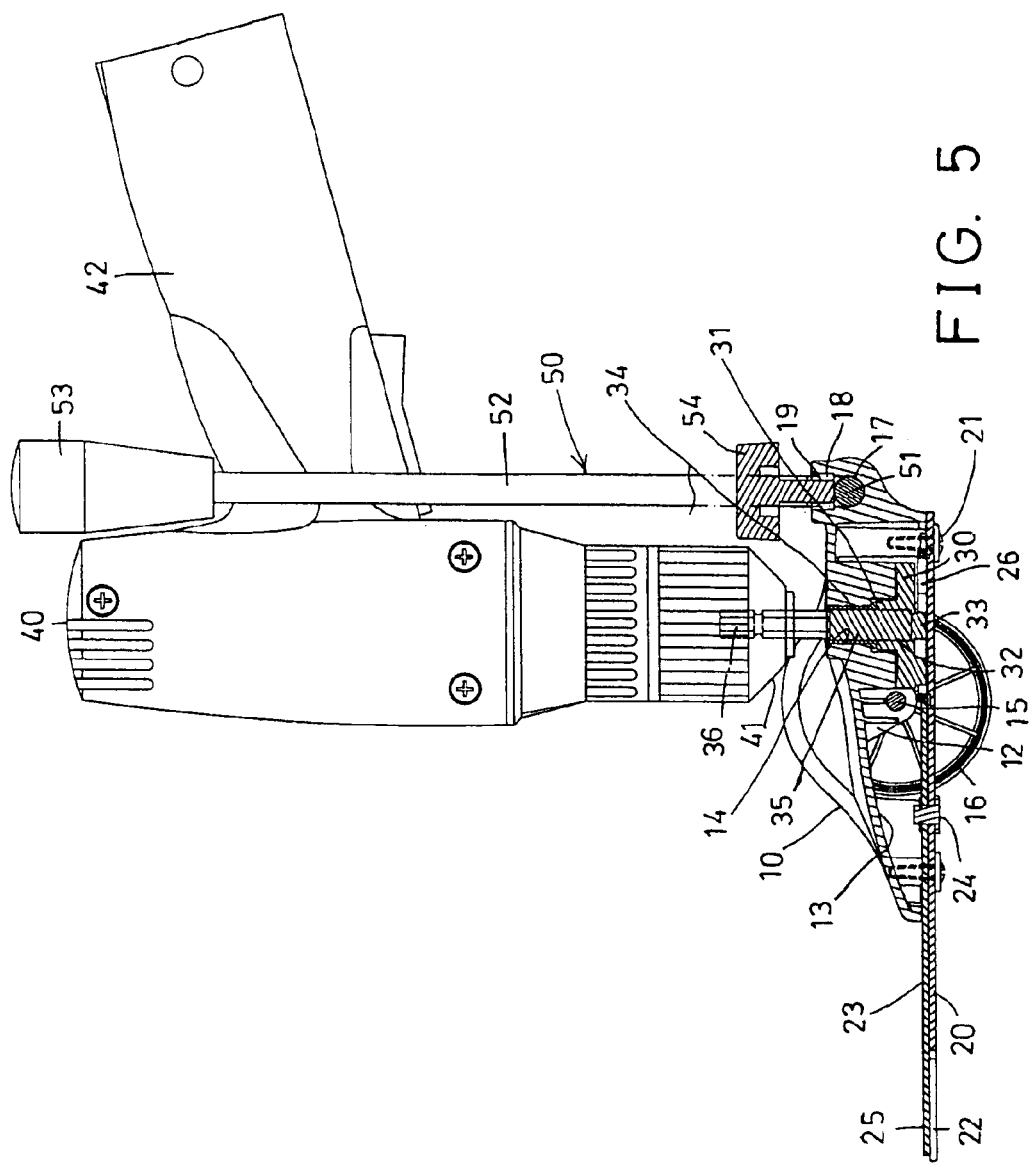
FIG. 5 is a partial cross sectional view of the grass trimmer, taken along lines 5—5 of FIG. 4.

The housing 10 further includes a passage 14 formed therein, such as vertically formed therein, and communicating with the chamber 13 thereof, and includes an aperture 17 formed therein, such as laterally formed in the rear portion thereof, and further includes a hole 18 formed in the rear portion thereof, and intersecting or communicating with the aperture 17 thereof for receiving or securing or attaching a nut 19 therein, best shown in FIGS. 1 and 5.

A fixed cutter device 20 is secured to bottom of the housing 10 with such as fasteners 21, and includes one or more stationary cutter blades 22 extended forwardly and outwardly of the housing 10. A rotary or movable cutter device 23 includes an intermediate portion pivotally or rotatably secured to the fixed cutter device 20 with a pivot shaft 24, to allow the movable cutter device 23 to be rotated relative to the fixed cutter device 20 in reciprocating action.

The movable cutter device 23 also includes one or more cutter blades 25 extended forwardly and outwardly of the housing 10, and movable relative to or active with the cutter blades 22 of the fixed cutter device 20 for conducting cutting operations. The movable cutter device 23 includes an oblong hole 26 formed in the rear portion thereof, and a ring or gasket 27 is attached to the movable cutter device 23 and engaged around the oblong hole 26 of the movable cutter device 23.

Figure 6:
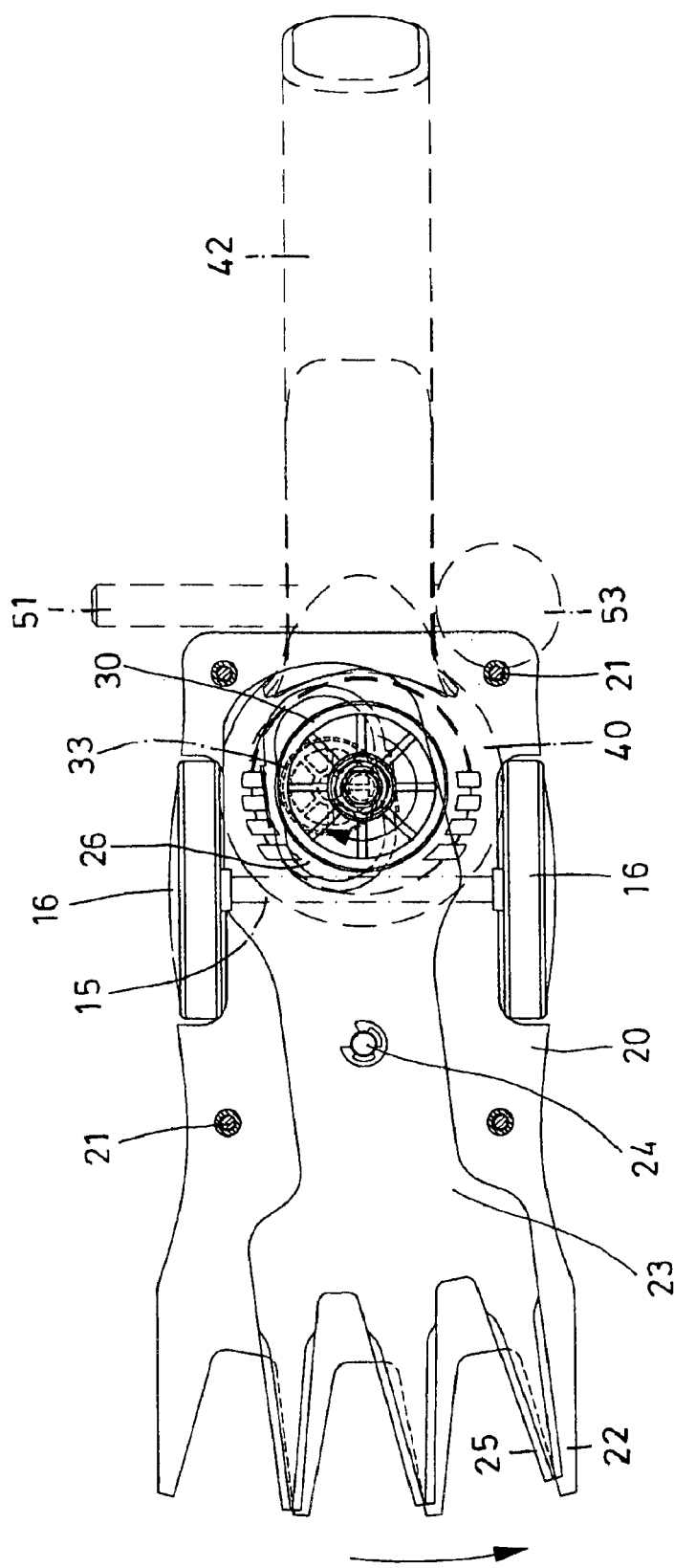
FIG. 6 is a partial top plan view of the grass trimmer, in which a housing of the grass trimmer has been removed to clearly show an inner structure of the grass trimmer.

A rotary member 30 is rotatably attached to the housing 10, for example, the rotary member 30 includes a hub 31 extended therefrom and rotatably engaged into the passage 14 of the housing 10, for allowing the rotary member 30 to be rotatably secured to the housing 10 and rotatably retained between the housing 10 and the movable cutter device 23. The rotary member 30 includes a bore 32 formed therein and aligned with or communicating with the passage 14 of the housing 10, and includes an eccentric member 33 extended downwardly therefrom (FIG. 3) and slidably engaged in the oblong hole 26 of the movable cutter device 23, best shown in FIG. 6.

A gasket or a barrel 34 may further be provided and secured or engaged into the passage 14 of the housing 10. A drive shank 35 is rotatably engaged through the barrel 34, and secured to the rotary member 30, and rotated in concert with the rotary member 30, and includes a free end 36 extended out of the housing 10, and preferably having a non-circular cross section, such as a hexagonal cross section.

A typical power tool 40 includes an engaging end 41 engageable to or attachable to the free end 36 of the shank 35, for rotating or driving the rotary member 30 relative to the housing 10, and for forcing or moving the eccentric member 33 relative to the movable cutter device 23, and thus for moving the eccentric member 33 along the oblong hole 26 of the movable cutter device 23 in reciprocating action. The typical power tool 40 includes a hand grip 42 extended therefrom for being held or grasped by users.

The movable cutter device 23 may thus be forced or caused to rotate relative to the fixed cutter device 20 in reciprocating action, and thus to force or to cause the cutter blades 22, 25 of the fixed cutter device 20 and of the movable cutter device 23 to be moved relative to each other, in order to conduct the cutting operations. One example of the typical power tools 40 has been disclosed in U.S. Pat. No. 4,493,223 to Kishi et al. which may be taken as a reference for the present invention.

The grass trimmer may further include a handle 50 having a short or lateral arm 51 rotatably engaged through the aperture 17 of the housing 10, and having a stem 52 extended from the lateral arm 51, and preferably perpendicular to the arm 51, and having a knob 53 attached or secured to a free end of the stem 52, for being held or grasped by users. A fastener 54 may be threaded with the nut 19 of the housing 10, and may be engaged with the arm 51 of the handle 50, to secure the handle 50 to the housing 10 at any selected or suitable angular position.

Figure 7:
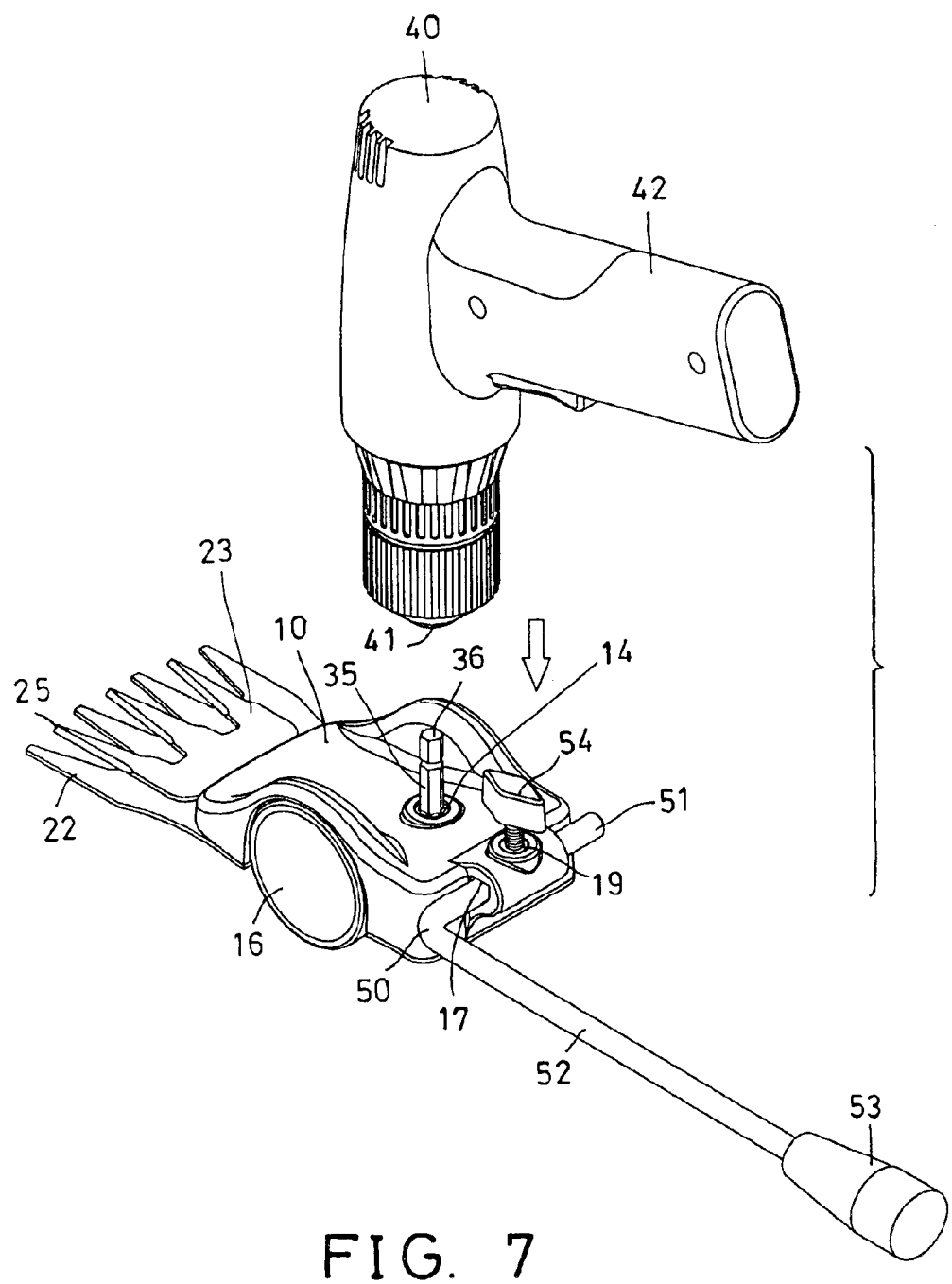
FIG. 7 is a partial exploded view of the grass trimmer and the power tool combination.

In operation, as shown in FIG. 7, the power tool 40 may first be engaged onto the shank 35, in order to rotate or to drive the rotary member 30 relative to the housing 10, and then to force or move the eccentric member 33 relative to the movable cutter device 23, and thus to move the movable cutter device 23 relative to the fixed cutter device 20 in reciprocating action, and to force or to cause the cutter blades 22, 25 of the fixed cutter device 20 and of the movable cutter device 23 to be moved relative to each other, in order to conduct the cutting operations.

Figure 4:
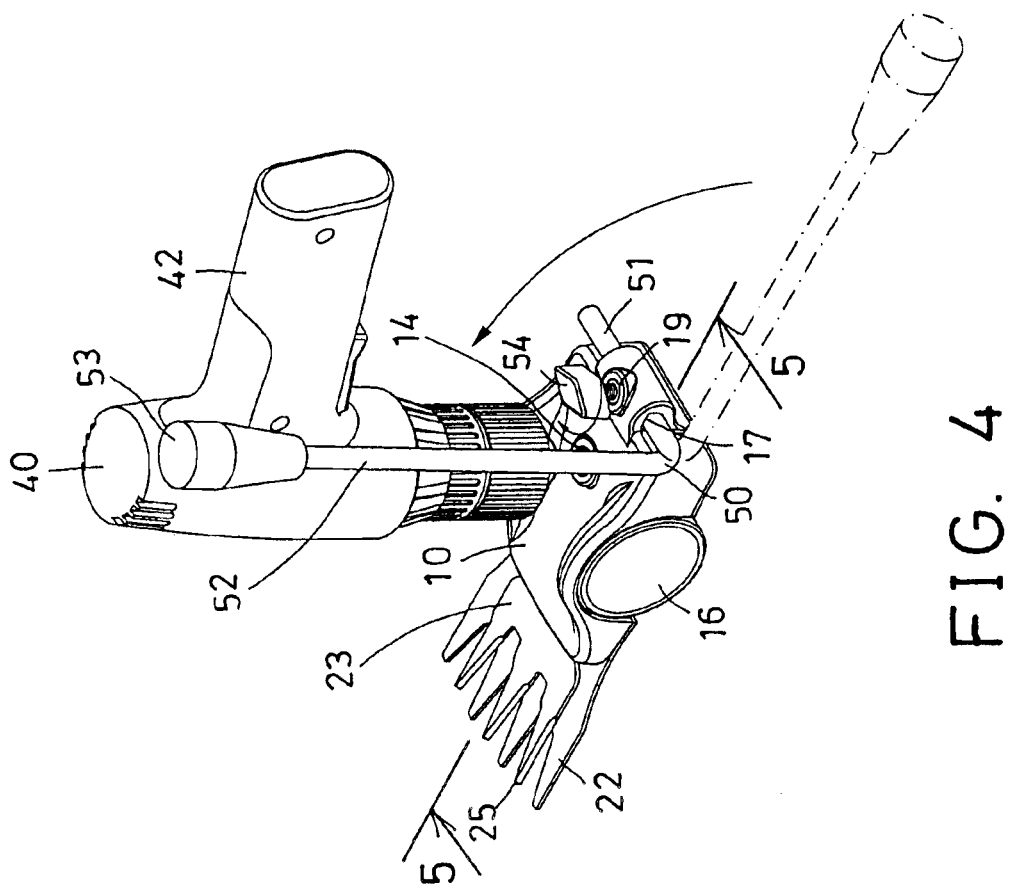
FIG. 4 is a perspective view of the grass trimmer and the power tool combination.
Figure 8:
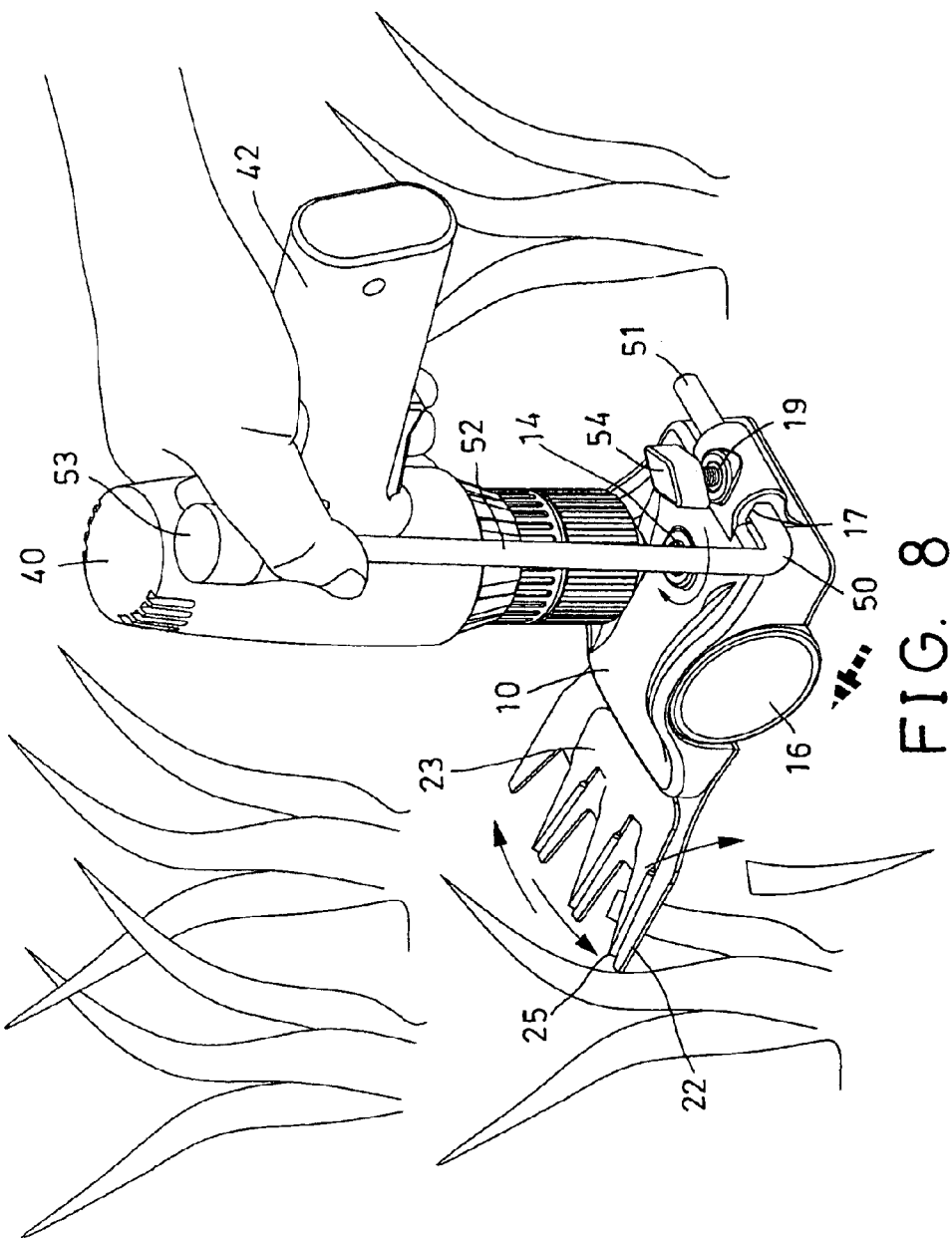
FIG. 8 is a perspective view illustrating the operation of the grass trimmer and the power tool combination.

As shown in FIG. 4, the handle 50 may then be rotated relative to the housing 10 from a lateral or horizontal receiving position as shown in dotted lines in FIG. 4, to an upwardly extending working position as shown in solid lines in FIG. 4, where the handle 50 is located beside or close to the hand grip 42 of the power tool 40, for allowing the handle 50 and the hand grip 42 of the power tool 40 to be simultaneously grasped or held by the users, and thus for allowing the users to move the housing 10 and the power tool 40 together, best shown in FIG. 8.

It is to be noted that every family may have one or more typical power tools 40 that have not been frequently used or operated. The grass trimmer in accordance with the present invention includes a structure having a shank 35 extended out of the housing 10, and engageable with the power tool 40, for allowing the grass trimmer to be operated or driven by the typical or separate power tools 40 that may be commonly possessed in families.

Accordingly, the grass trimmer in accordance with the present invention includes a structure operatable or drivable by typical or separate power tools that may be commonly possessed in families.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A grass trimmer comprising:

a housing, a fixed cutter device secured to said housing, and including at least one stationary cutter blade extended out of said housing, a movable cutter device rotatably secured to said fixed cutter device with a pivot shaft and rotatable relative to said fixed cutter device in reciprocating action, said movable cutter device including at least one cutter blade extended out of said housing, and movable relative to said at least one stationary cutter blade of said fixed cutter device for conducting cutting operations, a rotary member rotatably attached to said housing and including an eccentric member extended therefrom and engageable with said movable cutter device, to cause said movable cutter device to move relative to said fixed cutter device in reciprocating action when said rotary member is rotated relative to said housing, a drive shank secured to said rotary member and rotated in concert with said rotary member and including a free end extended out of said housing, and a power tool including an engaging end attachable to said free end of said shank, to rotate and drive said rotary member relative to said housing, and to move said eccentric member relative to said movable cutter device, and to move said movable cutter device relative to said fixed cutter device in reciprocating action.

2. The grass trimmer as claimed in claim 1, wherein said movable cutter device includes an oblong hole formed therein, said eccentric member of said rotary member is rotatably received in said oblong hole of said movable cutter device.

3. The grass trimmer as claimed in claim 2, wherein said movable cutter device includes a gasket attached thereto and engaged around said oblong hole thereof, for engaging with said eccentric member of said rotary member.

4. The grass trimmer as claimed in claim 1, wherein said housing includes a passage formed therein, said rotary member includes a hub extended therefrom and rotatably engaged into said passage of said housing, to rotatably secure said rotary member to said housing.

5. The grass trimmer as claimed in claim 4, wherein said housing includes a barrel engaged into said passage thereof, to rotatably receive said shank.

6. The grass trimmer as claimed in claim 1, wherein said free end of said shank includes a non-circular cross section.

7. The grass trimmer as claimed in claim 1, wherein said free end of said shank includes a hexagonal cross section.

8. The grass trimmer as claimed in claim 1, wherein said housing includes at least one wheel rotatably attached thereto with a wheel axle.

9. The grass trimmer as claimed in claim 8, wherein said housing includes an orifice formed therein to rotatably receive said wheel axle, said at least one wheel is attached to said wheel axle.

10. The grass trimmer as claimed in claim 1, wherein said housing includes a handle attached thereto for being held by users together with a hand grip of said power tool.

11. The grass trimmer as claimed in claim 10, wherein said handle includes an arm rotatably secured to said housing, and a stem extended from said arm, and movable toward said hand grip of said power tool.

12. The grass trimmer as claimed in claim 10, wherein said housing includes a fastener threaded thereto, and engageable with said handle, to secure said handle to said housing at selected angular position.

* * * * *